US008569063B1

(12) United States Patent
Sahi et al.

(10) Patent No.: US 8,569,063 B1
(45) Date of Patent: Oct. 29, 2013

(54) PLANTA GOLD NANOPARTICLE MANUFACTURE

(75) Inventors: Shivendra Vikram Sahi, Bowling Green, KY (US); Ajay Jain, New Delhi (IN)

(73) Assignee: Western Kentucky University Research Foundation, Bowling Green, KY (US)

( * ) Notice: Subject to any disclaimer, the term of this patent is extended or adjusted under 35 U.S.C. 154(b) by 251 days.

(21) Appl. No.: 13/082,648

(22) Filed: Apr. 8, 2011

(51) Int. Cl.
  *B82Y 10/00* (2011.01)
  *B82Y 30/00* (2011.01)
  *B82Y 5/00* (2011.01)
  *A01G 31/02* (2006.01)

(52) U.S. Cl.
  USPC ............... 435/410; 435/431; 438/1; 977/727; 977/903; 977/923; 977/904; 47/59

(58) Field of Classification Search
  None
  See application file for complete search history.

(56) References Cited

U.S. PATENT DOCUMENTS

| 2005/0009170 A1 | 1/2005 | Gardea-Torresdey et al. |
| 2005/0214194 A1 | 9/2005 | Ahmad et al. |
| 2009/0239280 A1 | 9/2009 | De Windt et al. |

FOREIGN PATENT DOCUMENTS

| WO | 2008003522 A1 | 1/2008 |
| WO | 2009063508 A2 | 5/2009 |
| WO | 2009140694 A2 | 11/2009 |
| WO | 2010142004 A2 | 12/2010 |

OTHER PUBLICATIONS

Sau et al. (J. Am. Chem. Soc. 2004, 126, 8648-8649).*
Sokolov et al (Cancer Research 63, 1999-2004, May 1, 2003).*
Armendariz et al. (Journal of Nanoparticle Research 6: 377-382, 2004).*
Starnes, Daniel L., et al., In planta Engineering of Gold Nanoparticles of Desirable Geometries by Modulating Growth Conditions: An Environment-Friendly Approach, Environmental Science & Technology, Aug. 10, 2010, pp. 7110-7118, vol. 44, No. 18, American Chemical Society, USA.
Gardea-Torresdey, J. L., et al., Formation and Growth of Au Nanoparticles Inside Live Alfalfa Plants, American Chemical Society, Oct. 21, 2001, 5 pages.
Lengke, Maggy F. et al., Morphology of Gold Nanoparticles Synthesized by Filamentous Cyanobacteria from Gold (I)-Thiosulfate and Gold (III)-Chloride Complexes, vol. 22, No. 6; 2006 American Chemical Society, published on web Feb. 10, 2006; pp. 2780-2787.
Parsons, J.G. et al., Kinetics and thermodynamics of the bioreduction of potassium tetrachloroaurate using inactivated oat and wheat tissues; Jun. 28, 2008; pp. 1579-1588; published online Jun. 17, 2009, Springer Science +Business Media B.V. 2009.
Pimprikar, P.S. et al. , Influence of biomass and gold salt concentration on nanoparticle synthesis by the tropical marine yeast Yarrowia lipolytica NCIM 3589; 74(2009), ScienceDirect; pp. 309-316.
Deshpande, Raghunandan et al.; Rapid biosynthesis of irregular shaped gold nanoparticles from macerated aqueous extracellular dried clove buds (*Syzygium aromaticum* ) solution; 79 (2010); pp. 235-240; Science Direct.
Singh, Ashwani Kumar et al.; Biosynthesis of gold and silver nanoparticles by natural precursor clove and their functionalization with amine group; published online Jan. 6, 2010; Springer Science+Business Media B.V. 2010; pp. 1667-1675.
Treguer-Delapierre, M. et al.; Synthesis of non-spherical gold nanoparticles; Gold Bulletin 2008 41/2; pp. 195-207.
Zeiri, L.; SERS of plant material; Journal of Raman Spectroscopy, 2007; 38; pp. 950-955; published online Apr. 17, 2007 in Wiley InterScience (www.interscience.wiley.com) DOI:10.1002/JRS. 1714.

* cited by examiner

*Primary Examiner* — David T Fox
*Assistant Examiner* — Jared Shapiro
(74) *Attorney, Agent, or Firm* — Middleton Reutlinger; John F. Salazar; George David McClure, Jr.

(57) ABSTRACT

Disclosed is a method for manufacturing a plurality of gold nanoparticles in a plant, the method comprising growing the plant hydroponically, contacting at least a first part of the plant with a substance comprising at least one gold salt, providing an average photosynthetic active radiation (PAR) to at least second part of the plant, waiting a period of time sufficient for formation of a plurality of gold nanoparticles in at least a portion of the plant, thereby manufacturing the plurality of gold nanoparticles in the plant. Disclosed also are, inter alia, a plurality of gold nanoparticles manufactured by such a method; an article of manufacture comprising a plurality of gold nanoparticles manufactured by such a method; and a plurality of triangular gold nanoparticles manufactured by such a method.

8 Claims, 5 Drawing Sheets

PLANTA GOLD NANOPARTICLE MANUFACTURE

BACKGROUND OF THE INVENTION

Unique properties of gold nanoparticles (AuNPs) can be achieved by manipulating their geometries. However, it has not been known in the art how to modulate shapes and sizes of AuNPs in planta.

BRIEF SUMMARY OF THE INVENTION

An embodiment of the invention provides in planta gold nanoparticle manufacture, wherein shape and/or size of AuNPs is modulated.

BRIEF DESCRIPTION OF THE DRAWINGS

Reference to the figures discloses several aspects and/or embodiments of the invention and is not to be interpreted as limiting the scope of the invention.

DETAILED DESCRIPTION OF THE INVENTION

Figure 1:
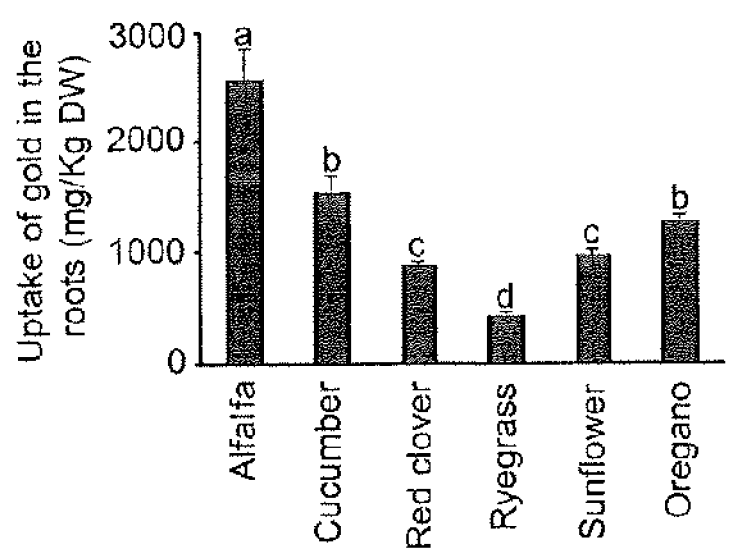
FIG. 1 shows differential uptake of gold by taxonomically diverse plant species. Different plant species were initially germinated on soilless medium for 15 d under greenhouse conditions and subsequently transferred to a hydroponic setup containing modified 0.5× Hoagland's solution supplemented with 100 ppm $KAuCl_4$ for 15 d under controlled growth room conditions. The data are presented for the ICP analysis of gold accumulation in the roots. Values are means±SE and different letters on the histogram represent means that differ significantly ($P<0.05$).

The following detailed description of the invention is provided primarily for clearness of understanding of the invention. No unnecessary limitations are to be understood therefrom. To those skilled in the art, modifications will become obvious upon reading the disclosure and may be made without departing from the spirit of the invention and scope of the appended claims.

Embodiments of the invention are provided, inter alia, in various aspects, as enumerated below, yet solely for illustrative purposes, with equivalents clearly occurring to the person skilled in the art.

Aspect 1. A method for manufacturing a plurality of gold nanoparticles in a plant, the method comprising growing the plant hydroponically, contacting at least a first part of the plant with a substance comprising at least one gold salt, providing an average photosynthetic active radiation (PAR) to at least second part of the plant, waiting a period of time sufficient for formation of a plurality of gold nanoparticles in at least a portion of the plant, thereby manufacturing the plurality of gold nanoparticles in the plant.

Aspect 2. A method according to Aspect 1, wherein at least a portion of the plurality of gold nanoparticles have an essentially uniform size.

Aspect 3. A method according to Aspect 1, wherein at least a portion of the plurality of gold nanoparticles have an essentially uniform shape.

Aspect 4. A method according to Aspect 2, wherein the essentially uniform size is selected from the group consisting of: 1-10 nm; 11-20 nm; 21-30 nm; 31-40 nm; 41-50 nm.

Aspect 5. A method according to Aspect 3, wherein the essentially uniform shape is selected from the group consisting of: spherical; rectangular; hexagonal; triangular; pentagonal; cylindrical; prismatic; conical.

Aspect 5a. A method according to Aspect 3, wherein the essentially uniform shape is any shape that might be acceptable, including without limitation each shape recited in Aspect 5.

Aspect 6. A method according to Aspect 1, wherein the substance is an aqueous substance.

Aspect 7. A method according to Aspect 6, wherein the aqueous substance has a pH of between about 2.8 and about 9.8.

Aspect 7a. A method according to Aspect 7, wherein the pH is between about 2.9 and about 9.6, between about 3.0 and about 9.4, between about 3.1 and about 9.2, between about 3.2 and about 9.0, between about 3.3 and about 8.8, between about 3.4 and about 8.6, between about 3.5 and about 8.4, between about 3.6 and about 8.2, between about 3.7 and about 8.0, or between about 3.7 and about 7.9.

Aspect 8. A method according to Aspect 7, wherein the pH is between about 3.8 and about 7.8.

Aspect 8a. A method according to aspect 8, wherein the pH is about 3.8, about 5.8, or about 7.8.

Aspect 9. A method according to Aspect 1, wherein the plant is selected from the group consisting of: alfalfa; cucumber; red clover; ryegrass, sunflower; oregano; *Arabidopsis thaliana; Hordeum vulgare; Triticum aestivum; Oryza sativa; Zea mays; Solanum tuberosum; Brassica napus; Glycin max; Solanum lycopersicum; Helianthus annuus; Secale cereal; Nicotiana tabacum*.

Aspect 9a. A method according to Aspect 1, wherein the plant is any plant that might be acceptable, including without limitation each plant recited in Aspect 9.

Aspect 10. A method according to Aspect 1, wherein the average PAR is between about 0 and about 1000 $\mu mol\, m^{-2}s^{-1}$.

Aspect 10a. A method according to Aspect 10, wherein the average PAR is between about 10 and about 900 $\mu mol\, m^{-2}s^{-1}$, between about 20 and about 800 $\mu mol\, m^{-2}s^{-1}$, between about 30 and about 700 $\mu mol\, m^{-2}s^{-1}$, between about 40 and about 600 $\mu mol\, m^{-2}s^{-1}$, between about 50 and about 500 $\mu mol\, m^{-2}s^{-1}$, between about 60 and about 400 $\mu mol\, m^{-2}s^{-1}$, between about 70 and about 300 $\mu mol\, m^{-2}s^{-1}$, between about 80 and about 200 $\mu mol\, m^{-2}s^{-1}$, or between about 90 and about 150 $\mu mol\, m^{-2}s^{-1}$, or between about 100 and about 120 $\mu mol\, m^{-2}s^{-1}$.

Aspect 11. A plurality of gold nanoparticles produced by a method comprising growing a plant hydroponically, contacting at least a first part of the plant with a substance comprising at least one gold salt, providing an average photosynthetic active radiation (PAR) to at least a second part of the plant, waiting a period of time sufficient for formation of the plurality of gold nanoparticles in at least a portion of the plant.

Aspect 12. The plurality of gold nanoparticles of Aspect 11, wherein at least a portion of the plurality have an essentially uniform size.

Aspect 13. The plurality of gold nanoparticles of Aspect 11, wherein at least a portion of the plurality have an essentially uniform shape.

Aspect 14. The plurality of gold nanoparticles of Aspect 12, wherein the essentially uniform size is selected from the group consisting of: 1-10 nm; 11-20 nm; 21-30 nm; 31-40 nm; 41-50 nm.

Aspect 15. The plurality of gold nanoparticles of Aspect 13, wherein the essentially uniform shape is selected from the group consisting of: spherical; rectangular; hexagonal; triangular; pentagonal; cylindrical; prismatic; conical.

Aspect 16. An article of manufacture comprising a plurality of gold nanoparticles produced by a method comprising growing a plant hydroponically, contacting at least a first part of the plant with a substance comprising at least one gold salt, providing an average photosynthetic active radiation (PAR) to at least a second part of the plant, waiting a period of time sufficient for formation of the plurality of gold nanoparticles in at least a portion of the plant.

Aspect 17. The article of manufacture of Aspect 16, wherein the article of manufacture is an antibody or biomarker.

Aspect 18. The article of manufacture of Aspect 16, wherein the article of manufacture is a molecular sensor.

Aspect 19. The article of manufacture of Aspect 16, wherein the article of manufacture is a stain.

Aspect 20. A plurality of triangular gold nanoparticles produced by a method comprising growing a plant hydroponically, contacting at least a first part of the plant with a substance comprising at least one gold salt, providing an average photosynthetic active radiation (PAR) to at least second part of the plant, and waiting a period of time sufficient for formation of the plurality of triangular gold nanoparticles in at least a portion of the plant, wherein the substance has a pH of about 3.8 and the PAR is of between about 100 and about 120 $\mu mol\, m^{-2}s^{-1}$.

Aspect 21. A plurality of hexagonal gold nanoparticles produced by a method comprising growing a plant hydroponically, contacting at least a first part of the plant with a substance comprising at least one gold salt, providing an average photosynthetic active radiation (PAR) to at least second part of the plant, and waiting a period of time sufficient for formation of the plurality of hexagonal gold nanoparticles in at least a portion of the plant, wherein the substance has a pH of about 7.8 and the PAR is of between about 100 and about 120 $\mu mol\, \mu mol\, m^{-2}s^{-1}$.

Aspect 22. A plurality of rectangular gold nanoparticles produced by a method comprising growing a plant hydroponically, contacting at least a first part of the plant with a substance comprising at least one gold salt, providing an average photosynthetic active radiation (PAR) to at least second part of the plant, and waiting a period of time sufficient for formation of the plurality of rectangular gold nanoparticles in at least a portion of the plant, wherein the substance has a pH of about 5.8 and the PAR is of between about 100 and about 120 $\mu mol\, m^{-2}S^{-1}$.

Equivalents to the foregoing aspects will be readily apparent to the person skilled in the art.

For example, a method according to the invention will be appreciated as susceptible of being practiced in any of a number of plants. A plant in which a method according to the invention may be practiced may be, by way of example and not of limitation, a member of any of the following species and accordingly all other members of the taxa to which they belong: *Arabidopsis thaliana, Hordeum vulgare, Triticum aestivum, Oryza sativa, Zea mays, Solanum tuberosum, Brassica napus, Glycin max, Solanum lycopersicum, Helianthus annuus, Secale cereal, Nicotiana tabacum*.

A substance comprising a gold salt may contain $KAuCl_4$ but may include any of a number of other gold salts, such as, by way of non-limiting example, $AuCl$, $AuI$, $AuBr_3$, $AuCl_3$, $HAuCl_4$, $HAuBr_4$, and so forth, or any combination thereof.

Similarly, ranges recited in various aspects are ranges that the person skilled in the art may rightly identify as capable of further extension, whether those ranges pertain, by way of example and not of limitation, to particle shape or size; PAR; pH; temperature; length of photoperiod; concentration of a component of a nutrient medium, such as sucrose or phosphorus; concentration or other level of a stress-inducing component; and so forth; or any combination thereof.

The following examples and technical details further illustrate, but do not limit or demarcate, the breadth of the invention.

Introduction

Nanotechnology is a nascent, albeit fast-growing, field of generating nanomaterials with unique optoelectronic and physicochemical attributes with applications in medicine, consumer goods, heavy industry, information and communication technologies, optoelectronic devices, environment-friendly energy systems, chemical catalyses, and the list continues to grow (1). (A list of literature cited by sequentially-numbered references is provided below.) Nanomaterials are broadly classified into carbon- and metal-(gold, silver, and other metal oxides) based materials. Among the metal-based nanomaterials, AuNPs exhibit properties dramatically different from that of bulk gold and are amenable to manipulation for yielding desirable geometries with varied applications (1). For instance, infrared radiation mediated cauterization of cancerous cells can be achieved by introducing gold nanotriangles attached to antibodies or biomarkers (2). Furthermore, AuNPs have extremely dense electron clouds and have the potential of scattering light that makes them an excellent candidate for molecule sensing and as a contrasting and staining material in the field of optics (3).

In vivo synthesis of AuNPs by uni- and multicellular organisms provides an environment-friendly and potentially economically viable alternative. In fact, diatoms and magnetotactic and S-layer bacteria have an innate ability to produce nanoscale materials (4). Furthermore, phytochemicals have the unique ability to reduce metal salt ($M^{x+}$) into elemental metal ($M^0$) (5) This property has been successfully employed for the phytoreduction of ionic Au (III) to metal Au (0) by using either whole biomass or extract from different parts (leaf, fruit) of taxonomically diverse plant species (6-12). One of the limitations of this approach has been the generation of mostly monodisperse spherical AuNPs. This could be due to the inability of either manipulating or fine-tuning the phytochemical constituents in the extracts that may be actively involved in the reduction of ionic Au (III) to metal Au (0).

Certain plant species have the ability to incorporate remarkably high levels of heavy elements including Pb, Hg, and Au into their tissues (13-15). These studies were largely focused on exploiting the potential of metal hyperaccumulating plants in scavenging toxic metal ions from contaminated and degraded soils. Only recently, X-ray absorption near edge spectroscopy (XANES) demonstrated the in planta ability of *Sesbania drummondii* to reduce more than 80% of $KAuCl_4$ into AuNPs ranging in sizes from 6-20 nm exhibiting in situ catalytic function (16). Other studies on alfalfa, *Chilopsis linearis*, and *Brassica juncea* further corroborated the in planta synthesis of AuNPs (17-19). However, similar to the biomass/extraction-mediated synthesis of AuNPs, those generated in planta were largely spherical in shape (16). Presently, it is not known if in planta synthesis of AuNPs is amenable to manipulation for generating desirable geometries.

In the study described below, the inventors tested the uptake of gold in the roots of a range of taxonomically diverse species. Maximum uptake of gold was observed in the roots of *Medicago sativa* (alfalfa) grown in the presence of $KAuCl_4$ (100 ppm). Further, the variations in the geometries of the in planta synthesized AuNPs in the roots were monitored in 15-day-old seedlings of alfalfa grown hydroponically and supplemented with $KAuCl_4$ (50 ppm) for different lengths of time (6 h, 12 h, 1 d, 3 d, 5 d, and 7 d). Alfalfa was also subjected to $KAuCl_4$ (50 ppm) treatment for 3 d under variable pH (3.8, 5.8, and 7.8), temperature (15, 25, 35° C.), and photosynthetically active radiation (PAR) (0 and 100-120 µmol $m^{-2}s^{-1}$) regimes for determining the influence of growth conditions on the shapes and sizes of in planta synthesized AuNPs.

Here, the inventors evaluated the accumulation of gold across taxonomically diverse plant species (alfalfa, cucumber, red clover, ryegrass, sunflower, and oregano). Significant variations were detected in the uptake of gold in the roots ranging from 500 ppm (ryegrass) to 2500 ppm (alfalfa). Alfalfa was selected for subsequent studies due to its ability to accumulate relatively large quantities of gold in its roots. Temporal analysis revealed that most of the AuNPs formed within 6 h of treatment, and the majority of them fall within the size range of 10-30 nm. Spherical AuNPs (1-50 nm) were detected ubiquitously across different treatments. To elucidate the effects of growth variables on the geometries of in planta synthesized AuNPs, alfalfa was subjected to $KAuCl_4$ (50 ppm) treatment for 3 d under different pH, temperature, and light regimes. Interestingly, manipulation of growth conditions triggered a noticeable shift in the relative abundance of spherical, triangular, hexagonal, and rectangular AuNPs providing empirical evidence toward the feasibility of their in planta engineering.

Materials and Methods

Seed Germination. The seeds of alfalfa (*Medicago sativa*), cucumber (*Cucumis sativus*), oregano (*Organum vulgare*), red clover (*Trifolium pratensei*, rye grass (*Lolium multiflorum*), and sunflower (*Helianthus annuusi*) were planted in autoclaved Premier PRO-MIX 'BX' (Premier Horticulture Inc., PA) soilless medium. Seeds were germinated in a growth chamber in dark for 3 d followed by 16 h/8 h day/night cycle at 25° C. with an average PAR of 100-120 µmol $m^{-2}s^{-1}$ provided by fluorescent tubes.

Gold Uptake Study. Fifteen-day-old seedlings were removed from the soilless medium, washed thoroughly under running water, followed by three rinses with sterile deionized (DI) $H_2O$, Single seedlings (cucumber and sunflower) or groups of 10-15 seedlings (alfalfa, ryegrass, oregano, red clover) were transferred to a hydroponic setup constituting disposable polypropylene cups (200 mL capacity) containing modified 0.5× Hoagland's solution (2.50 mM $Ca(NO_3)_2.4H_2O$, 1.25 mM $K_2SO_4$, 1.0 mM $MgSO_4.7H_2O$, 250 µM $KH_2PO_4$, 0.13 µM KCl, 2.25 µM $MnSO_4.H_2O$, 12.5, µM $H_3BO_3$, 1.9 µM $ZnSO_4.7H_2O$, 0.25, µM $CuSO_4.5H_2O$, 0.1, µM $Na_2MoO_4.2H_2O$, and 28 ppm Fe-sequestrene) supplemented with 100 ppm $KAuCl_4$ (pH adjusted to 5.8). Cups were capped with aluminum foil allowing the aerial parts of the seedlings to pass through and suspending only the roots in the $KAuCl_4$ solution. Seedlings were then grown under controlled growth conditions for 15 d (16 h/8 h day/night cycle at 25° C. with an average PAR of 100-120 µmol $m^{-2}s^{-1}$). For each treatment, roots and shoots were harvested from two independent biological replicates with three technical replicates from each, rinsed with sterile DI $H_2O$, blot-dried, ground in liquid nitrogen, and stored at —80° C. for subsequent analysis.

Analysis of Gold in Plant Tissue. Root and shoot samples were weighed and placed in a 15 mL screw capped Teflon beaker. Concentrated $HNO_3$ (3 mL) was added to the sample and the beaker was placed on a hot plate (100° C.) overnight, and then evaporated to dryness. Samples were allowed to cool and sterile DI $H_2O$ was added to make a final volume of 20 mL. Inductively Coupled Plasma (ICP) analysis was carried out using an external calibration procedure and Y (0.1 ppm) was used as an internal standard to correct for drift and matrix effect (20).

Analysis of Root Morphology. Fifteen-day-old seedlings of alfalfa, grown on soilless medium, were transferred to a hydroponic setup containing modified 0.5× Hoagland's solution supplemented with 0 (control), 50, and 100 ppm $KAuCl_4$. After two weeks of treatment, roots were excised from the shoots. Roots were then transferred to 1.0% (w/v) agar Petri plates, spread gently with a hair brush under stereo microscope to reveal the morphological details, and scanned in transmissive mode at 600 dpi (Epson Perfection V700 Photo). The ImageJ program was used for documenting the total root length from the scanned images.

KAuCl$_4$ Treatment under Variable Growth Conditions. Fifteen-day-old seedlings of alfalfa, grown on soilless medium, were transferred to a hydroponic setup containing 75 mL of sterile DI H$_2$O supplemented with 50 ppm KAuCl$_4$ Gold treatment was carried out under controlled growth conditions (pH 5.8, 25° C., and PAR in the range of 100-120 µmol m$^{-2}$ s$^{-1}$) for varying time intervals (30 min, 1 h, 6 h, 12 h, 1 d, 3 d, 5 d, and 7 d). Another set of seedlings was subjected to KAuCl$_4$ (50 ppm) treatment for 3 d under different PAR (0 µmolm$^{-2}$s$^{-1}$ and 100-120 µmol m$^{-2}$s$^{-1}$), temperature (15, 25, 35° C.), and pH (3.8, 5.8, and 7.8) regimes. After the treatment, roots were harvested from two independent biological replicates with three technical replicates from each, rinsed with sterile DI H$_2$O, blot-dried, ground in liquid nitrogen, and stored at −80° C. for subsequent analysis.

Transmission Electron Microscopy (TEM). About 50 mg of the cryo-ground gold-treated roots was suspended in 2 mL of DI H$_2$O. A 500, µL aliquot of the root extract was transferred to a 1.5 mL eppendorftube and pulse-sonicated on ice (10 s at 95% power followed by a 15 s rest with 5 pulses per cycle) with 3 mm standard probe of the VCX 130 ultrasonic processor (Sonics & Materials). After each sonication cycle, the root extract was centrifuged at 4° C. for 30 sat 10 000 rpm in a tabletop centrifuge. The sonication-centrifugation cycles were repeated thrice to maximize the breakdown of the root tissues. Finally, the sonicated root extract was pelleted by centrifugation at 10 000 rpm for 30 sand 10, µL was transferred onto the 400 mesh copper Formvar coated grids. Samples were viewed at 100 kV and micrographs were captured at 66 000× by 120 CX TEM (JEOL JEM).

Energy Dispersive X-ray Spectroscopy (EDS). KAuCl$_4$-treated roots were frozen, fractured in liquid nitrogen, freeze-dried for 24 h, and then mounted onto aluminum stubs. Samples were viewed at an accelerating potential of 20 kV under high vacuum mode with the backscatter detector in place using a JSM-5400LV scanning electron microscope (JEOL) equipped with IXRF EDS system with a MoxtekAP3.3 light element entrance window.

Statistical Analysis. Statistical significance of differences between mean values was determined using Student's t test. Different letters on the histograms are used to indicate means that were statistically different at P<0.05.

Results

Differential Spatial Accumulation of Gold in Taxonomically Diverse Plant Species. There were significant (P<0.05) variations in the uptake of gold among the roots of different species investigated (FIG. 1). The values ranged from 500 ppm in lyegrass to almost five times higher (2500 ppm) in alfalfa. However, no significant (P<0.05) variations were observed in accumulation of gold either between the roots of taxonomically diverse red clover and sunflower or between cucumber and oregano. Accumulation of gold in the shoots also exhibited significant variations across the species (Figure Sl in the Supporting Information). For example, oregano and sunflower accumulated significantly (P<0.05) higher levels of gold in the shoots compared to the other species. This study revealed spatial variations in accumulation of gold relatively independent of plant species and is in agreement with an earlier study (13). Interestingly though, significantly (P<0.05) higher accumulation of gold by oregano suggests the species to be a potential metal hyperaccumulator. Whether oregano could be used for phytoextraction of gold from gold mine tailings is a matter of conjecture and warrants further investigation. Although the detection of AuNPs in the cytoplasm of the root cells of S. drummondii suggested the likelihood of an active symplastic transport system involved in the uptake of gold by the roots and its subsequent mobilization to aerial parts (16), the actual molecular mechanisms governing the uptake and mobilization of gold in different plant species remains elusive. Plants often fail to differentiate between essential nutrients and the ones that are closely related but could be unessential and potentially toxic. For instance, in soils the most abundant arsenic species is As(V) and its toxicity is derived from its close chemical similarity to phosphate (Pi). The similarity between these anions makes plants highly sensitive to As(V) due to their inability to differentiate between the two and thus easily incorporated into cells through high-affinity Pi transport system (21). Furthermore, there is prevalence of interactions across several essential and nonessential elements (22, 23). Therefore, it is logical to presume that plants apparently use some default transport mechanism for the uptake and mobilization of gold that is otherwise evolved for one of the essential nutrients. However, a more conclusive evidence could be drawn from model plants like *Arabidopsis thaliana* and *Medicago truncatula* with their whole genome having been sequenced thereby facilitating molecular analyses (24, 25).

Figure 2:
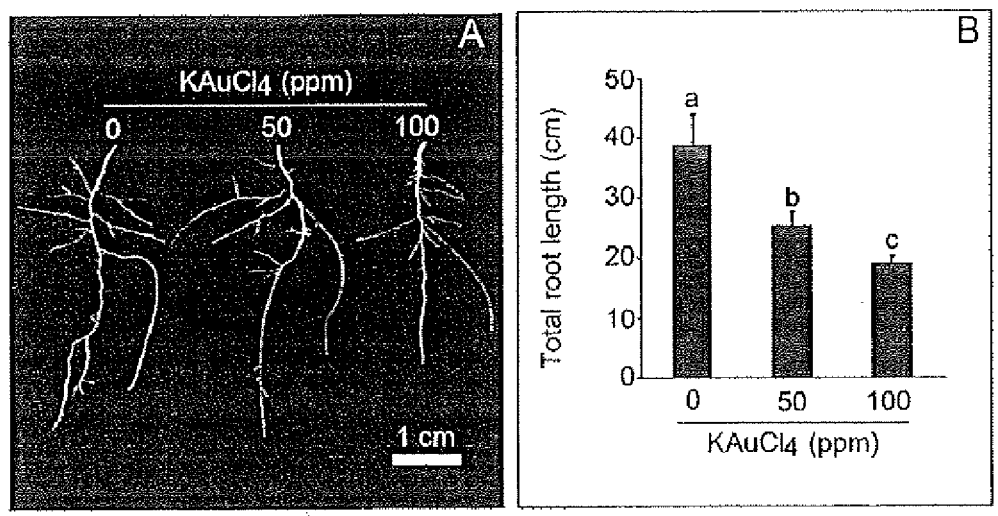
FIG. 2 shows a dosage-dependent effect of $KAuCl_4$ treatment on the root system of alfalfa. Alfalfa seeds were initially germinated on soilless medium for 15 d under greenhouse conditions and subsequently transferred to a hydroponic setup containing modified 0.5× Hoagland's solution supplemented with $KAuCl_4$ (50 and 100 ppm). As control, one set was maintained in the hydroponic setup without $KAuCl_4$ (0 ppm) treatment. (A) After the treatment, roots were excised from the shoots and the lateral roots were spread on 1% (w/v) agar plates to reveal the root morphology and is the representative of 10-12 seedlings each for different treatments. (B) Data presented for total root length. Values are means±SE and different letters on the histogram represent means that differ significantly ($P<0.05$).

Dosage-Dependent Effect of KAuCl$_4$ on the Root Growth. Root systems exhibit extensive developmental plasticity toward various nutritional stresses and/or other environmental cues (26). For instance, exposure of *A. thaliana* to the hexavalent form of chromium [Cr(VI)] at a concentration >200 µM leads to the arrested growth of the root system (27). Among the species investigated, alfalfa exhibited maximum accumulation of gold in its roots. Hence, it was subsequently used for determining the dosage-dependent effect of KAuCl$_4$ on the root growth. Fifteen-day-old seedlings of alfalfa, grown on soilless medium, were transferred to a hydroponic setup containing 0.5× Hoagland's solution supplemented with 0, 50, and 100 ppm KAuCl$_4$. After two weeks of treatment, there was significant (P<0.05) dosage-dependent inhibitory effect of KAuCl$_4$ on the root growth compared to the control seedlings (FIGS. 2A and B). Although no significant effect was observed on the root growth of *C. linearis* exposed to 0-80 ppm KAuCl$_4$, a significant reduction in root length (ranging from 17 to 37%) was evident upon exposure at a higher concentration (160 ppm) for 13, 18, and 23 d (19). Differential dosage-dependent responses of the root systems of alfalfa and *C. linearis* to KAuCl$_4$ could be a reflection of their variable adaptive responses to stress imposed by heavy metals. However, the molecular responses of the plants to gold treatment are far from being elucidated. Use of technologies such as micro array and suppression subtractive hybridization could expedite the global profiling of the spatiotemporal molecular responses to varying concentrations of KAuCl$_4$ treatments in taxonomically diverse plant species.

Figure 3:
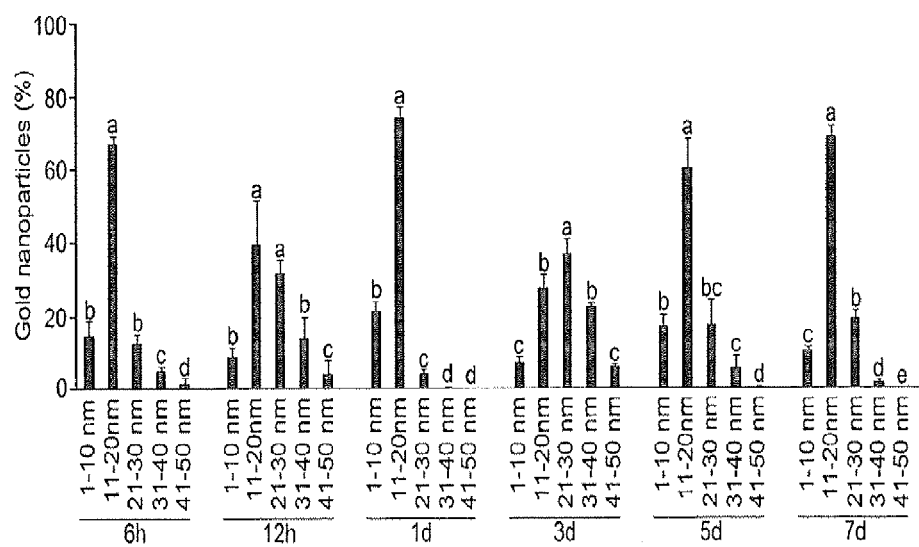
FIG. 3 shows a temporal effect of $KAuCl_4$ treatment on in planta synthesis of variable sizes of AuNPs. Alfalfa seeds were initially germinated on soilless medium for 15 d under greenhouse conditions and subsequently transferred to a hydroponic setup containing modified 0.5× Hoagland's solution supplemented with 50 ppm $KAuCl_4$. Roots were harvested sequentially over a period of time (6 h, 12 h, 1 d, 3 d, 5 d, and 7 d), ground in liquid nitrogen, transferred to a 400 mesh Formvar copper grid and observed under transmission electron microscope, and micrographs were captured at 66 000×. Data are presented for the size distribution of AuNPs. Values are means±SE and different letters on the histogram represent means that differ significantly ($P<0.05$).

Effects of Growth Parameters on the Size Distribution of In planta Synthesized AuNPs. Light scattering and optical properties exhibited by nanoparticles are highly dependent on their geometries (28). However, the effects of growth variables on the geometries of in planta synthesized AuNPs have not been elucidated. Therefore, initially a temporal study was conducted to determine the optimal time that would be required to assess the effects of various growth variables on the size distribution of in planta synthesized AuNPs. To decipher this, 15-day-old alfalfa seedlings were transferred to a hydroponic setup containing 0.5× Hoagland's solution supplemented with 50 ppm KAuCl$_4$. Root tissues were harvested temporally (30 min, 1 h, 6 h, 12 h. 1 d, 3 d, 5 d, and 7 d), micrographs were captured by TEM, and geometries of the AuNPs were documented (FIG. 3). In planta synthesis of AuNPs could be detected as early as 6 h following KAuCl$_4$ treatment. However, the duration of KAuCl$_4$ treatment did not exert any significant influence either on the size or shape of the AuNPs. Majority of them were mono disperse sphericals (83-88%), followed by rectangulars (10-14%), and hexagonals (1-4%) with average sizes in the range of 18-23 nm. Interestingly though, gold nanotriangles were detected only occasionally across the treatments and represented <1% of the total AuNPs. AuNPs constituting variable shapes (spherical, rectangular, hexagonal, and triangular), were further documented for their size distribution ranges. About 65% of the AuNPs formed were in the size range of 11-20 nm, whereas AuNPs particles in the size range of 1-10 nm and 21-30 nm constituted about 12-15% each. Larger AuNPs (31-50 nm) represented only a small percentage. A similar trend of size distribution was observed during longer periods of KAuCl$_4$ treatment with AuNPs in the size range of 11-20 nm constituting the predominant form. Since the distribution of AuNPs shifted to a more uniform bell curve upon 3 d of treatment, this time point was used for subsequent analysis of the effects of variable growth treatments on the size distribution of AuNPs.

Among the growth parameters, pH has a substantial influence on the availability of the nutrients to plants. For example, at low pH phosphorus (P) reacts with iron (Fe) and aluminum (Al) to form low solubility FePO$_4$ and Al$_4$PO$_4$, making these elements relatively unavailable to plants. Low phosphate (Pi) condition triggers elevated levels of cation elements (Fe and Zn) in the plants (29). Since plants often fail to differentiate between elements that share close chemical similarity, lowering the pH of the medium could possibly create a condition amicable for an elevated uptake of cations including Au$^{3+}$. Temperature also exhibits profound influence on the growth responses and nutrient uptake by plants (30). In addition, availability of PAR is equally pivotal for optimal photosynthetic activity and the production of photosynthates that are not only required as metabolites but also act as signaling molecules (31). Further, plants take up more P and nitrogen (N) from nutrient solution during low and high PAR conditions, respectively. Thus, it was logical to assume the likely effects of these interacting growth parameters not only on the uptake of essential elements but also that of Au$^{3+}$ by root system. Therefore, for determining the effects of different growth conditions (GC) on the size distribution of AuNPs, 15-day-old seedlings of alfalfa were transferred to a hydroponic setup containing 0.5× Hoagland's solution supplemented with 50 ppm KAuCl$_4$ and were maintained for 3 d under control condition (GC1: pH 5.8, 25° C., PAR 100-120 µmol m$^{-2}$ s$^{-1}$), in the nutrient medium with pH modified to 3.8 (GC2) and 7.8 (GC3), at variable temperatures of 15° C. (GC4), and 37° C. (GC5), and in the dark (GC6).

Figure 4:
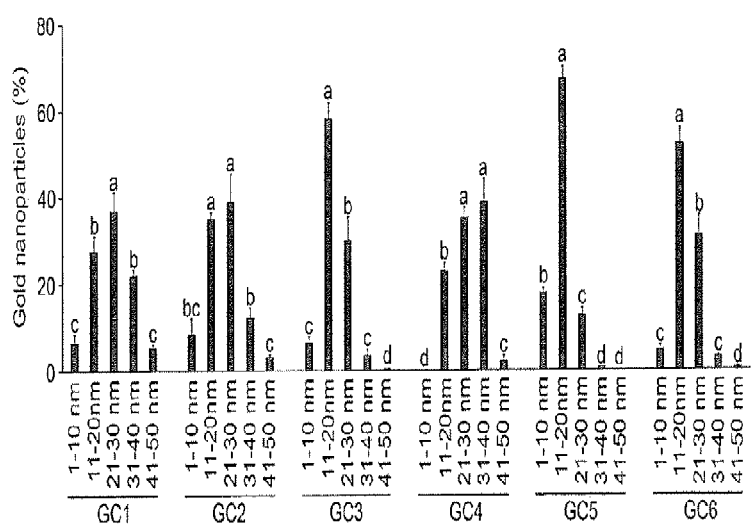
FIG. 4 shows an effect of variable growth conditions on size distribution of in planta synthesized AuNPs. Alfalfa seedlings were treated with 50 ppm $KAuCl_4$ in a hydroponic setup (as described in the description of FIG. 3) and subjected to the following growth conditions (GC) for 3 d: GC1 (Control; pH 5.8, 25° C., PAR 100-120 $\mu mol\ m^{-2}\ s^{-1}$), GC2 (pH 3.8, 25° C., PAR 100-120 $\mu mol\ m^{-2}\ s^{-1}$), GC3 (pH 7.8, 25° C., PAR 100-120 $\mu mol\ m^{-2}\ s^{-1}$), GC4 (pH 5.8, 15° C., PAR 100-120 $\mu mol\ m^{-2}\ s^{-1}$), GC5 (pH 5.8, 37° C., PAR 100-120 $\mu mol\ m^{-2}\ s^{-1}$), and GC6 (pH 5.8, 25° C., dark). Ground roots were observed under transmission electron microscope and micrographs were captured at 66 000×. Data are presented for the percent size distribution of AuNPs. Values are means±SE and different letters on the histogram represent means that differ significantly ($P<0.05$).

FIG. 4 shows the effect of variable growth parameters (GC1-GC6) on the percent distribution of AuNPs across different size ranges. Although under GC1 and GC2 the AuNPs particles revealed more of a bell-curved distribution across size classes ranging from 1-10 nm to 41-50 nm, a significant (P<0.05) shift was evident toward the size range of 11-20 nm under GC2. This shift toward smaller sized (11-20 nm) AuNPs became significantly (P<0.05) more pronounced under GC3 treatment. However, the average sizes of AuNPs were comparable (22-24 nm) in the roots of the plants grown under different pH regimes (GC1-GC3). Variations in the temperature and light conditions also revealed significant (P<0.05) influences on the sizes of the AuNPs. For instance, lower temperature (GC4) resulted in a shift toward higher size range AuNPs (31-40 nm). Whereas, higher temperature (GC5) and dark condition (GC6) significantly (P<0.05) triggered the formation of AuNPs in the size range of 11-20 nm. Light and dark conditions (GC1 and GC6) did not exert any influence on the average sizes of AuNPs. Interestingly though, the average sizes of AuNPs under GC1 (21.82), GC4 (27.36), and GC5 (14.94) were significantly (P<0.05) different.

This study thus demonstrates the potential engineering of in planta synthesized AuNPs of desirable geometries by manipulating different growth parameters. Earlier studies have also reported variable sizes of in planta synthesized AuNPs ranging from about 0.3 to 50 nm in S. drummondii, C. linearis, and B. juncea (16, 18, 19). Total Au concentration in tissues and their location (root, stem, and leaves) in plant have been suggested as the likely determinants affecting the size of the AuNPs (19). However, variable sizes (20-40 nm) of AuNPs have also been observed during synthesis using the extract from whole plant biomass (10). Furthermore, the sizes of the AuNPs could be regulated by manipulating the concentration of the lemongrass extract in the reaction medium (9). Therefore, the likely influence of the tissue type on the sizes of AuNPs could be debated and warrants in-depth analysis of the mechanism(s) affecting their sizes both during in planta synthesis and those generated from the extracts of different tissue types across diverse plant species.

Figure 5:
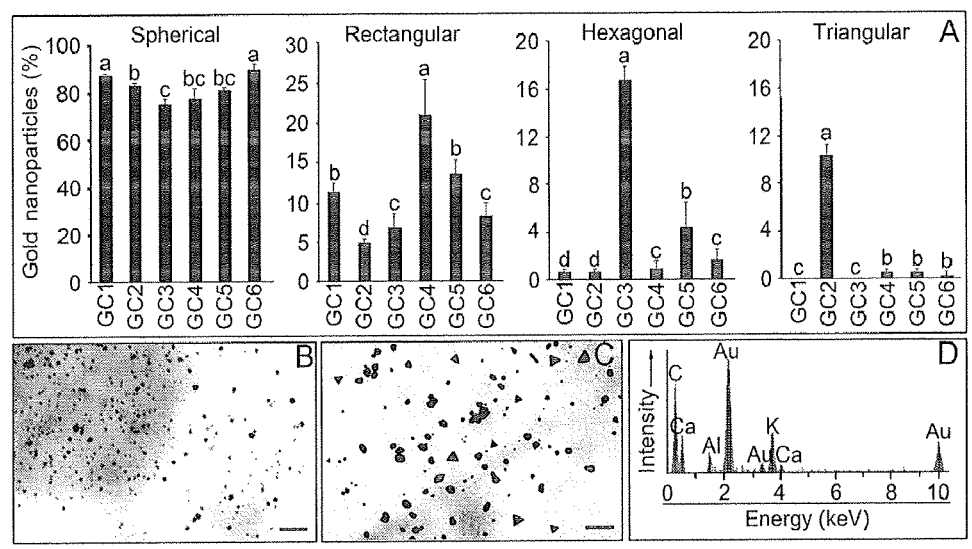
FIG. 5 shows an effect of variable growth conditions on shapes of in planta synthesized AuNPs. Alfalfa seedlings were treated with 50 ppm $KAuCl_4$ in a hydroponic setup and subjected to different growth conditions (GC1-GC6) (as described in the description of FIG. 4). Roots were observed under transmission electron microscope and micrographs were captured at 66 000×. (A) Data are presented for the percent size distribution of different shapes of gold nanoparticles. Values are means±SE and different letters on the histogram represent means that differ significantly ($P<0.05$). (B and C) The micrographs show (B) gold spherical and (C) gold triangular nanoparticles formed under control GC1 and GC2, respectively. The bars in B and C represent 100 nm. (D) Energy dispersive X-ray spectroscopic spectrum validating the fidelity of the AuNPs.

Effects of Growth Parameters on the Shapes of In planta Synthesized AuNPs. The duration of KAuCl$_4$ treatments ranging from 6 h up to 7 d did not exhibit any significant (P<0.05) influence on the percent shape distribution of the AuNPs in the roots. The majority of them were monodisperse spherical (83-88%), followed by rectangular 10-14%) and hexagonal 0-4%). Gold nanotriangles were detected only occasionally across the treatments and represented <1% of the total AuNPs. Our data are consistent with an earlier study reporting the in planta synthesis of largely spherical AuNPs (16). However, the ratio of spherical/triangular or spherical/hexagonal AuNPs could be manipulated by varying the concentration of lemongrass extract to HAuCl$_4$ (9). In another study, feasibility of using sodium citrate and cetyltrimethylammonium bromide (CTAB) for extracting gold nanotriangles from oat and wheat biomass was demonstrated (10). In the present study, alfalfa was subjected to KAuCl$_4$ treatment under different growth conditions (GC1-GC6) to determine whether desirable geometries of AuNPs could be engineered in planta (FIG. 5). Among the growth parameters tested, low (3.8) and high (7.8) pH of the KAuCl$_4$-supplemented nutrient medium triggered significant (P<0.05) increases in the triangular and hexagonal shapes, respectively (FIG. 5A-C). Low temperature treatment (GC4) resulted in relatively significant (P<0.05) higher percent formation of gold nanorectangles (FIG. 5A). EDS analysis further validated the fidelity of in planta synthesized AuNPs (FIG. 5D).

In conclusion, for the first time the inventors have provided evidence toward the feasibility of engineering AuNPs of desirable geometries in planta by micro management of different growth attributes. The biomatrix-embedded AuNPs have been shown to exhibit catalytic property (16). However, the molecular mechanisms regulating the uptake of KAuCl$_4$ by the roots and its reduction into AuNPs of different geometries merit further detailed studies.

LITERATURE CITED

1 Ratner, M.; Ratner, D. *Nanotechnology; A Gentle Introduction to the Next Big Idea*; Prentice Hall Upper Saddle River, N.J., 2003.

2 Loo, C.; Lin, A.; Hirsch, L.; Lee, M. H.; Barton, J.; Halas, N.; West, J.; Drezek, R. Nanoshell-enabled photonics-based imaging and therapy of cancer. *Technol. Cancer Res. Treat.* 2004, 3, 33-40.

3 Murphy, C. J.; Sau, T. K.; Gole, A. M.; Orendorff, C. J.; Gao, J.; Gou, L.; Hunyadi, S. E.; Li, T. J. Anisotropic metal nanoparticles: synthesis, assembly, and optical applications. *Phys. Chem.* 2005, 109, 13857-13870.

4 Pum, D.; Sleytr, U. B. The application of bacterial S-layers in molecular nanotechnology. *Trends Biotechnol.* 1999, 17, 8-12.

5 Kumar, V.; Yadav, S. K Plant-mediated synthesis of silver and gold nanoparticles and their applications. *Chem. Technol. Biotechnol.* 2009, 84, 151-157.

6 Shankar, S. S.; Ahmad, A.; Pasricha, R; Sastry, M. Bioreduction of chloroaurate ions by geranium leaves and its endophytic fungns yields gold nanoparticics of different shapes. *J. Mater. Chem.* 2003, 13, 1822-1826.

7 Shankar, S. S.; Rai, A; Ankamwar, B.; Singh, A; Ahmad. A: Sastry, M. Biological synthesis of triangular gold nanoprisms. *Nat. Mater.* 2004, 3, 482-488.

8 Shankar, S. S.; Rai, A; Ahmad, A; Sastry, M. Rapid synthesis of Au, Ag, and bimetallic Au core-Ag shell nanoparticles using Neem (*Azadirachta indica*) leaf broth. *J. Colloid Interface Sci.* 2004, 275, 496-502.

9 Shankar, S. S.; Rai, A.; Ahmad, A.; Sastry, M. Controlling the optical properties of lemongrass extract synthesized gold nanotriangles and potential application in infrared-absorbing optical coatings. *Chem. Mater.* 2005, 17, 566-572.

10 Armendariz, V.; Parsons, J. G.; Martha, L. L.; Peralta-Videa, H. J.; Iosc-Yacarnan, M.; Gardea-Torresdey, J. L. The extraction of gold nanoparticles from oat and wheat biomasses using sodium citrate and cetyltrimethylammonium bromide, studied by x-ray absorption spectroscopy, high resolution transmission electron microscopy, and UV-visible spectroscopy. *Nanotechnology* 2009, 20, 1-8.

11 Chandran, S. P.; Minakshi, C; Pasricha, H.; Ahmad, A.; Sastry, M. Synthesis of gold nanotriangles and silver nanoparticles using Aloe vera plant extract. *Biotechnol. Prog.* 2006, 22, 557-583.

12 Wang, Y.; He, X.; Wang, K; Zhang, X.; Tan, W. Barbated Skullcup herb extract-mediated biosynthesis of gold nanoparticles and its primary application in electrochemistry. *Colloids Surf, B* 2009, 73, 75-79.

13 Anderson, C. W. N.; Brooks, R R.; Stewart, R. B.; Simcock, R. Harvesting a crop of gold in plants. *Nature* 1998, 395, 553.

14 Srivastava, A K.; Venkatachalam, P.; Raghothama, K. G.; Sahi, S. V. Identification of lead-regulated genes by suppression subtractive hybridization in the heavy metal accumulator *Sesbania drummondii*. *Planta* 2007, 225, 1353-1365.

15 Venkatachalam, P.; Srivastava, A K; Raghothama, KG.; Sahi, S. V. Genes induced in response to mercury-ion exposure in heavy metal hyperaccumulator *Seshania drummondii*. *Environ. Sci. Technol.* 2007, 43, 843-850.

16 Sharma, N.C.; Sahi, S. V.; Nath, S.; Parsons, J. G.; Gardea-Torresdey, J. L.; Pal, T. Synthesis of plant-mediated gold nanoparticles and catalytic role of biomatrix-embedded nanomaterials. *Environ. Sci. Tecl*11101. 2007, 41, 5137-5142.

17 Gardea-Torrcsday, J. L.; Parson, J. G.; Gomez, E.; Peralta-idea, J.; Troiani, H. E.; Santiago, P.; Yacaman, M. J. Formation and growth of Au nanoparticies inside live alfalfa plants. *Nano Lett.* 2002, 2, 397-40 1.

18 Marshall, A T.; Haverkamp, R G.; Davies, C. E.; Parsons, J. G.; Gardea-Torresdey, J. L.; van Agtervcld, D. Accumulation of gold nanoparticles in *Brassica juncea. Int.J. Phytorem.* 2007, 9, 197-206.

19 Rodriguez, E.; Parsons, J. G.; Peralta-Videa, J. R; Cruz-Jimenez, G.; Romero-Gonzalez, J.; Sanchaze-Salcido, B. E.; Saupe, G. B.; Duarte-Gardea, M.; Gardea-Torrcsdey, J. L. Potential of Chi/apsis linearis for gold phytomining: using XAS to determine gold reduction and naoparticle formation within plant tissues. *Int. J. Phytorem.* 2007, 9, 133-147.

20 Schneegurt, M. A; Jain, J. C.; Menicuccu, J. A, Ir.: Brown, S.; Garafalo, D. F.; Quallic, M.; Neal, C. R.; Kulpa, C. F., Jr. Biomass byproducts for the remediation of wastewaters contaminated with toxic metals. *Environ. Sci. Technol.* 2001, 35, 3786-3791.

21 Catarecha, P.; Segura, M. D.; Franco-Zorrilla, J. M.; Garcia-Ponce, B.; Lanza, M.; Solano, R; Paz-Ares, J.; Leyva, A. A mutant of the *Arabidopsis* phosphate transporter PI-IT]; 1 displays enhanced arsenic accumulation. *Plant Cell* 2007, 19, 1123-1133.

22 Clark, R. B.; Pier, H. A; Knudsen, D. Effect of trace element deficiencies and excesses on mineral nutrients in sorghum.]. *Plant Nutr.* 1981, 3, 357-374.

23 Foy, C. D. Soil chemical factors limiting plant root growth. In *Advances in Soil Sciences; Limitations to Plant Root Growth*; Hatfield, J. L.; Stewart, B. A., Eds.; Springer Verlag: New York, 1992; pp 97-149.

24 Alonso, J. M.; Stepanova, A N.; Leisse, T. J.; et al. Genome-wide insertional mutagenesis of *Arabidopsis thaliana*. *Science* 2003, 301, 653-657.

25 Bell, C. J.; Dixon, R. A; Farmer, A. D.; et al. The *Medicago genome* initiative: a model legume datahase. *Nucleic Acids Res.* 2001, 29, 114-117.

26 Malarny, J. E.; Ryan, K. S. Environmental regulation of lateral root initiation in *Arabidopsis. Plant Physiol.* 2001, 127, 899-909.

27 Castro, H. O.; Trujillo, M. M.; Lopez-Bucio, J.; Cervantes, C. Effects of dichromate on growth and root system architecture of *Arabidopsis thaliana* seedlings. *Plant Sci.* 2007, 172, 684-691.

28 Kelly, K. L.; Coronado, E.; Zhao, L. L.; Schatz, G. C. The optical properties of metal nanoparticles: the influence of size, shape, and dielectric environment. *J. Phys. Chem., B* 2003, 107, 668-677.

29 Misson, J.; Raghothama, K. G.; Jain, A; et al, A genome-wide transcriptional analysis using *Arabidopsis thaliana* Affymetrix gene chips determined plant responses to phosphate deprivation. *Proc. Natl. Acad. Sci. U.S.A.* 2005, 102, 11934-11939.

30 Menzel, C. M.; Simpson, D. R.; Winks, C. W. Effect of temperature on growth, flowering and nutrient uptake of three passionfruit cultivars under low irradiance. Sci. Hortic. 1987, 31, 259-268.

31 Rolland, F.; Baena-Gonzalez, E.; Sheen, J. Sugar sensing and signaling in plants: conserved and novel mechanisms. *Ann. Rev. Plant Bioi.* 2006, 57, 675-709.

The foregoing detailed description of the invention is provided primarily for clearness of understanding of the invention. No unnecessary limitations are to be understood therefrom. To those skilled in the art, modifications will become obvious upon reading the disclosure and may be made without departing from the spirit of the invention and scope of the appended claims. The figures show several aspects and/or embodiments of gold nanoparticles according to an embodiment of the invention, including inter alia aspects and/or embodiments of their size and their shape. This is not to be considered an exhaustive list of aspects and/or embodiments of gold nanoparticules as are considered to be within the scope of the invention, nor are the examples and/or embodiments of the foregoing verbal description to be considered an exhaustive list of aspects and/or embodiments of gold nanoparticles as are considered to be within the scope of the invention.

What is claimed is:

1. A method for manufacturing a plurality of gold nanoparticles in a plant seedling germinated from a plant seed, wherein the plant seed is an alfalfa plant seed, the method comprising:

planting the plant seed in a first soilless medium, germinating the plant seed in the first soilless medium in a growth chamber for fifteen days to form a plant seedling, removing the plant seedling from the first soilless medium, washing the plant seedling, contacting at least roots of the plant seedling with a second aqueous soilless medium comprising $KAuCl_4$, and providing an average photosynthetic active radiation (PAR) to at least aerial parts of the plant seedling during a fifteen-day period of time sufficient for formation of a plurality of gold nanoparticles in at least a portion of the plant seedling; thereby manufacturing the plurality of gold nanoparticles in the plant seedling;

wherein the plant is subjected to an average PAR, temperature, and a pH of the second aqueous soilless medium so that a majority of the plurality of gold nanoparticles have either an essentially uniform size or an essentially uniform shape.

2. The method according to claim 1, wherein the essentially uniform size is selected from the group consisting of: 1-10 nm; 11-20 nm; 21-30 nm; 31-40 nm; and 41-50 nm.

3. The method according to claim 1, wherein the essentially uniform shape is selected from the group consisting of:

spherical; rectangular; hexagonal; triangular; pentagonal; cylindrical; prismatic; and conical.

4. The method according to claim 1, wherein the aqueous second soilless medium has a pH from 3.8 to 7.8.

5. A method according to claim 4, wherein the pH is 3.8, 5.8 or 7.8.

6. A method according to claim 5, wherein the pH is 7.8.

7. The method according to claim 1, wherein the average PAR is from 100 to 120 $\mu mol\ m^{-2}s^{-1}$.

8. The method according to claim 1, wherein the temperature is between 15° C. and 37° C.

* * * * *